(12) United States Patent
MacMillan et al.

(10) Patent No.: US 11,624,812 B2
(45) Date of Patent: Apr. 11, 2023

(54) METHOD OF CHARACTERIZING, CALIBRATING, AND CONTROLLING GALVANOMETER LASER STEERING SYSTEMS

(71) Applicants: James MacMillan, Milford, NH (US); Leonard Williams, Hooksett, NH (US)

(72) Inventors: James MacMillan, Milford, NH (US); Leonard Williams, Hooksett, NH (US)

(*) Notice: Subject to any disclaimer, the term of this patent is extended or adjusted under 35 U.S.C. 154(b) by 640 days.

(21) Appl. No.: 16/622,704

(22) PCT Filed: Jun. 13, 2018

(86) PCT No.: PCT/US2018/037332
§ 371 (c)(1),
(2) Date: Dec. 13, 2019

(87) PCT Pub. No.: WO2018/231981
PCT Pub. Date: Dec. 20, 2018

(65) Prior Publication Data
US 2020/0103509 A1    Apr. 2, 2020

Related U.S. Application Data

(60) Provisional application No. 62/520,134, filed on Jun. 15, 2017.

(51) Int. Cl.
*G01S 7/497* (2006.01)
*G01B 9/02015* (2022.01)
(Continued)

(52) U.S. Cl.
CPC .......... *G01S 7/497* (2013.01); *G01B 9/02015* (2013.01); *G01S 17/08* (2013.01);
(Continued)

(58) Field of Classification Search
CPC .......... G01S 7/497; G01S 17/08; G01S 17/58; G01S 17/88; G01B 9/02015; G02B 26/0816
See application file for complete search history.

(56) References Cited

U.S. PATENT DOCUMENTS 8,040,530 B2   10/2011   Cooper et al.
8,237,788 B2    8/2012   Cooper et al.
(Continued)

FOREIGN PATENT DOCUMENTS

JP          60-107588  A  *  6/1985  ............. G01S 17/50

OTHER PUBLICATIONS

International Preliminary Reporton Patentability for Application No. PCT/US2018/037332 dated Dec. 17, 2019, 7 pages.
(Continued)

*Primary Examiner* — Kevin K Pyo
(74) *Attorney, Agent, or Firm* — Maine Cernota & Rardin

(57) ABSTRACT

A method and apparatus for quantitatively characterizing performance of a laser steering galvanometer mirror directs a laser beam from a calibration "sensor" onto a side region of the mirror to directly determine rotational positioning, velocity, and/or acceleration thereof using interferometry, time-of-flight measurements, and Doppler measurements. Measured positioning errors can be compared with a database to predict required calibration adjustments. Embodiments automatically adjust digital calibrations. Mirrors, splitters, and/or a plurality of sensors can apply measurement beams simultaneously or sequentially to both sides of a mirror, and/or to more than one mirror. Large rotation ranges, for example larger than +/−15 degrees, can be accommodated by applying measurement beams from a plurality of directions. The calibration apparatus can be (Continued)

distinct, or integral with the galvanometer, and can be used to monitor and/or to control the mirror positioning.

20 Claims, 11 Drawing Sheets

(51) Int. Cl.
*G01S 17/08* (2006.01)
*G01S 17/58* (2006.01)
*G01S 17/88* (2006.01)
*G02B 26/08* (2006.01)

(52) U.S. Cl.
CPC .............. *G01S 17/58* (2013.01); *G01S 17/88* (2013.01); *G02B 26/0816* (2013.01)

(56) References Cited

U.S. PATENT DOCUMENTS

| | | | |
|---|---|---|---|
| 9,718,146 B2 * | 8/2017 | Goldsmith | ............. B23K 26/04 |
| 2014/0333931 A1 | 11/2014 | Lu | |
| 2016/0202040 A1 | 7/2016 | Schlaudraff | |

OTHER PUBLICATIONS

PCT Search Report and Written Opinion for Application No. PCT/US2018/037332 dated Aug. 30, 2018, 12 pages.

* cited by examiner

METHOD OF CHARACTERIZING, CALIBRATING, AND CONTROLLING GALVANOMETER LASER STEERING SYSTEMS

RELATED APPLICATIONS

This application is a national phase application of international application PCT/US2018/037332 filed on Jun. 13, 2018. Application PCT/US2018/037332 claims the benefit of U.S. Provisional Application No. 62/520,134, filed Jun. 15, 2017. Both of these applications are incorporated by reference in their entirety for all purposes.

FIELD OF THE INVENTION

The invention relates to laser steering systems, and more particularly to methods of calibrating and controlling galvanometer mirror steering systems.

BACKGROUND OF THE INVENTION

Galvanometer scanners are used in a very wide range of applications, including barcode scanners, 3D printers, 3D scanners, laser displays and projectors, and CNC laser machine tools. Some of these applications require, or at least benefit from, scanners that provide high speed scanning with high control accuracy.

Typically, a high speed galvanometer scanner controls the direction of one or more laser beams using a galvanometer system that includes one or more mirrors controlled by servo motors. For ease of discussion, both the prior art and the present disclosure are discussed herein in the context of 2D scanning. However, it will be understood that single mirror, single direction systems such as some barcode scanners are also implicitly included, as well as systems that include more than two mirrors.

With reference to FIGS. 1A and 1B, a typical 2D scanning system controls the X and Y deflections of one or more output beams using a pair of shaft-mounted mirrors 100, 102 driven by a corresponding pair of servo motors 104. For systems that require high speed and accuracy, such as laser displays, laser projectors, and CNC (computer numerical control) laser machining devices, the mirrors 100, 102 are rotated clockwise and counter clockwise through angles of approximately +/−15 degrees, at frequencies as high as 80 kHz. The mirrors 104 may be separately mounted, as shown in FIG. 1A, or mounted together, as shown in FIG. 1B.

So as to provide a required degree of accuracy and speed, galvanometer systems used in demanding applications such as laser displays and projectors often utilize encoder type devices mounted to the servo motors 104 to provide positional feedback to the servo controllers 106. Unfortunately, because of imperfect manufacturing tolerances, the finite masses of the mirrors 100, 102, and the inherent torsional flexibility of the mirror shafts 108 and other mechanical components, the galvanometer mirrors have the potential, especially at high rotation frequencies, to be in rotational positons that do not correspond with what the servo-motor encoders indicate. This is sometimes referred to as "torsional servo motor and mirror twist," and it can give rise to velocity and positioning errors of the mirrors that are not measurable by the servo-motor encoders and cannot be ignored. In particular, galvanometer mirrors tend to lag the servo motors in position and velocity, and tend to overshoot their intended destinations before springing back into place. Line separations and overall poor quality laser projections can result.

Accordingly, the mirror control systems for demanding laser steering applications generally include additional adjustments that attempt to compensate for mirror twist and other mechanical imperfections. Typically, in additional to gain and offset adjustments, each of the X and Y controllers also includes separate adjustments for high frequency damping and low frequency damping. A typical system will therefore require at least eight adjustments for proper calibration, which are X and Y position (offset), X and Y gain, X and Y high frequency damping, and X and Y low frequency damping. Because the X and Y mirror movements must be coordinated with each other, in general all eight of these adjustments are inter-dependent.

As a result, when calibrating a high speed, high accuracy laser steering galvanometer system, it is generally necessary for a technician to iteratively adjust all eight of these settings while observing a resulting laser pattern. The International Laser Display Association (ILDA) had created standard "test patterns" that are commonly used for this purpose. FIG. 2A is an example of an ILDA test pattern, as displayed by a system that is out of adjustment, while FIG. 2B shows the same test pattern that results after the system has been brought into proper alignment.

Even with the help of standardized test patterns, the calibration of demanding laser steering galvanometer systems remains more of an "art" than a "science," whereby the adjustment and calibration depend on human skill and experience, which can be variable and often time consuming. Furthermore, the characterization of a galvanometer's accuracy, even after being calibrated, is qualitative at best, and does not lend itself to reproducible, quantifiable metrics.

What is needed, therefore, is a method for quantitatively characterizing the performance of a laser steering galvanometer system, for facilitating galvanometer calibration based on objective metrics, and for accurately controlling the mirrors in a galvanometer laser steering system.

SUMMARY OF THE INVENTION

The present invention is a method and apparatus for accurately and quantitatively characterizing and controlling the performance of a laser steering galvanometer system by providing precise, direct measurements of mirror positions, velocity, and/or acceleration during operation of the system.

Specifically, the present method implements a laser-based measurement system, whereby at least one calibration laser beam from a calibration "sensor" impinges directly onto a side region of at least one galvanometer mirror so as to determine the rotational positioning, velocity, and/or acceleration of the mirror during galvanometer operation. In some embodiments, the mirror position is determined by laser interferometry, while in other embodiments the laser position is determined by time-of-flight laser positioning. In various embodiments, Doppler shifts in the laser frequency are used to characterize the angular velocity of the mirror.

By characterizing the position of the mirror directly, rather than characterizing the position of the motor and then indirectly inferring the mirror position from the motor position, the present invention circumvents the accumulated errors that arise during operation of the galvanometer, including errors due to the finite mass of the galvanometer mirror and due to the torsional flexibility of the mirror shaft.

In embodiments, the measurement data obtained from the calibration laser beam is corrected to account for shifts in the location where the calibration beam impinges on the mirror as the mirror rotates.

In some embodiments, the measurement system includes at least one calibration mirror that is able to direct the calibration beam from the sensor to the galvanometer mirror. In various embodiments, a calibration mirror is used to transition the calibration beam to different locations on a galvanometer mirror and/or between mirrors in the galvanometer. In other embodiments, the measurement system includes a plurality of laser sensors that can direct a plurality of calibration laser beams onto mirrors in the galvanometer.

In various embodiments, calibration beams are directed onto more than one location on at least one mirror in the galvanometer. For example, embodiments simultaneously measure positions of two opposing sides of a mirror, for improved accuracy in measuring the rotational positioning of the mirror. The calibration beams can be generated by a plurality of laser sensors and/or by using a beam splitter to split the laser beam.

Embodiments are able to accommodate a large mirror rotation range by dividing the rotation range into a plurality of measurement sub-ranges. In some of these embodiments, the measurement sub-ranges are accommodated by using one or more calibration mirrors to re-route the calibration beam so that it can approach the galvanometer mirror from different directions. In other embodiments, calibration laser beams are directed at the galvanometer mirror from different directions by positioning a plurality of calibration sensors at corresponding locations surrounding the galvanometer mirror.

In some embodiments, the disclosed apparatus is applied to a separate galvanometer, while in other embodiments the disclosed apparatus is integral with the galvanometer system. In some of these embodiments, the apparatus is able to monitor the performance of the galvanometer over time, and to alert a user and/or automatically recalibrate the galvanometer if and when needed.

In a first general aspect, the invention is a method and apparatus for quantitatively characterizing the performance of a laser steering galvanometer system. In a second general aspect, the invention is a method of facilitating calibration of a laser steering galvanometer system by predicting the required calibration adjustments based on measured galvanometer performance. In embodiments of this general aspect, measured performance deviations are compared with a database of known performance deviations and corresponding adjustment errors so as to estimate the actual adjustment errors that require correction.

In a third general aspect, the invention is a method and apparatus for automatically calibrating a digitally controlled laser steering galvanometer system.

In a fourth general aspect, the invention is an apparatus for controlling the operation of a galvanometer, whereby direct measurements of mirror position are used as the feedback data for controlling servo motors that rotate the galvanometer mirrors.

A first general aspect of the present invention is a method of characterizing the performance of a galvanometer system that includes a mirror rotatably controlled by a motor system and associated controller. The method includes:
1) instructing the controller to direct the motor system to rotate the mirror to a desired orientation;
2) causing a laser measurement system to direct a laser beam onto a side region of the mirror;
3) detecting reflected light from the laser beam;
4) determining rotation information from the reflected light;
5) repeating steps 1-4; and
6) quantitatively characterizing mirror positioning error information based on a difference between the determined rotation position information and ideal position information.

A second general aspect of the present invention is a method of calibrating a galvanometer system that includes a mirror rotatably controlled by a motor system and associated controller. The method includes:
i) performing the method of claim 1;
ii) predicting required calibration adjustments of the galvanometer system based on the mirror positioning error information; and
iii) implementing the predicted calibration adjustments.

Embodiments of this second general aspect further include repeating steps i) through iii).

In any preceding embodiment of this general aspect, predicting the required calibration adjustments can include comparing the mirror positioning error information with known error information and corresponding known calibration misadjustments.

In any preceding embodiment of this general aspect, the predicted calibration adjustment can be implemented manually or electronically.

A third general aspect of the present invention is a method of controlling a galvanometer system that includes a mirror rotatably controlled by a motor system and associated controller. The method includes:
a) providing a command to the controller to direct the motor system to rotate the mirror to a desired orientation;
b) causing a laser measurement system to direct a laser beam onto a side region of the mirror;
c) detecting reflected light from the laser beam;
d) determining rotation information from the reflected light;
and
e) updating the command according to a difference between the determined rotation information and the desired orientation.

In any preceding embodiment of any of these general aspects, the laser measurement system can include a laser interferometer.

In any preceding embodiment of any of these general aspects, the laser measurement system can include a time of flight distance sensor.

In any preceding embodiment of any of these general aspects, the laser measurement system can be able to determine at least one of an angular position, and angular velocity, and an angular acceleration of the mirror.

In any preceding embodiment of any of these general aspects, the laser measurement system can be able to measure a rotational velocity of the mirror according to Doppler shifts of the reflected light as compared to the laser beam.

In any preceding embodiment of any of these general aspects, determining the rotation information from the reflected light can include correcting the rotation information so as to account for changes in an impingement location of the laser beam on the mirror due to rotation of the mirror.

In any preceding embodiment of any of these general aspects, the method can be applied to a plurality of mirrors in the galvanometer system.

In any preceding embodiment of any of these general aspects, the method can include applying a plurality of laser beams simultaneously to at least one mirror in the galvanometer system. In some of these embodiments, applying the plurality of laser beams includes using a plurality of laser sensors to simultaneously apply laser beams. In any of these embodiments, applying the plurality of laser beams can include using a beam splitter to split at least one laser beam. And in any of these embodiments, laser beams can be applied simultaneously to opposite sides of at least one galvanometer mirror.

In any preceding embodiment of any of these general aspects, at least one calibration mirror can be used to direct the laser beam onto the mirror.

In any preceding embodiment of any of these general aspects, determining the rotation information can include dividing a measurement range into a plurality of subranges, and for each of the subranges directing the laser beam onto the mirror from a corresponding measurement direction.

A fourth general aspect of the present invention is a rotation information measurement apparatus configured to measure rotation information pertaining to a mirror included in a galvanometer system by implementing at least one of the preceding method embodiments. The apparatus includes a laser sensor configured to direct a laser beam onto a side region of the mirror and to obtain the rotation information from light reflected therefrom.

In some of these embodiments, the apparatus is distinct from the galvanometer system, while in other of these embodiments the apparatus is integral with the galvanometer system.

In any of these apparatus embodiments, the apparatus can be configured to obtain the rotation information periodically as the galvanometer is operated, and to take corrective action if a difference between the rotation information and ideal rotation information exceeds a specified threshold. In some of these embodiments, the corrective action includes alerting an operator of the galvanometer. And in any of these embodiments, the corrective action can include automatically adjusting the galvanometer system so as to reduce the difference between the rotation information and the ideal rotation information to within the specified threshold.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

A method and apparatus are disclosed for accurately and quantitatively characterizing and controlling the performance of a laser steering galvanometer system by providing precise, direct measurements of mirror positions, velocities, and/or accelerations during operation of the system.

Figure 1A:
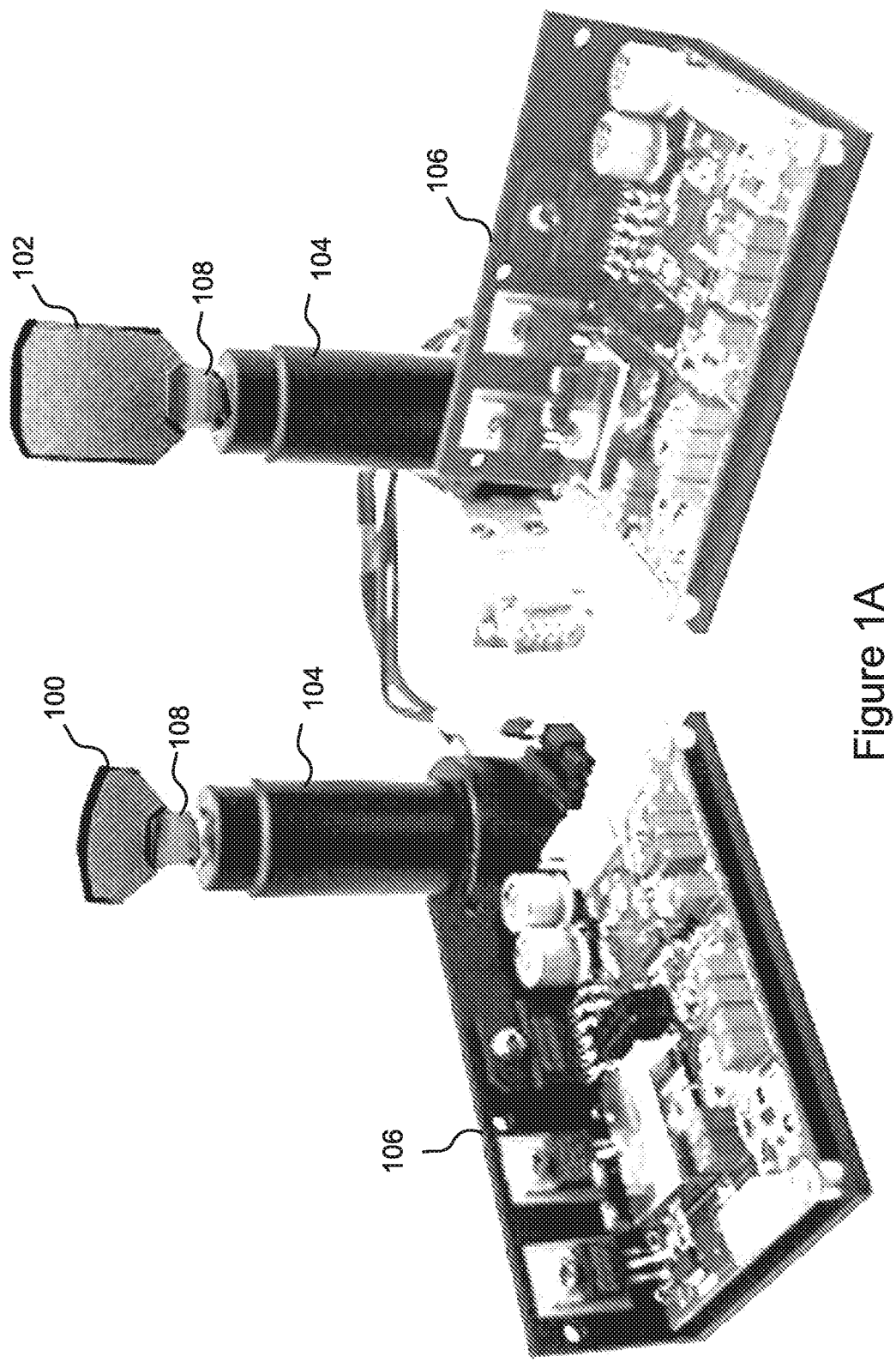
FIG. 1A is a perspective view of a pair of galvanometer mirrors having separate mounts and controlling modules according to the prior art.
Figure 1B:
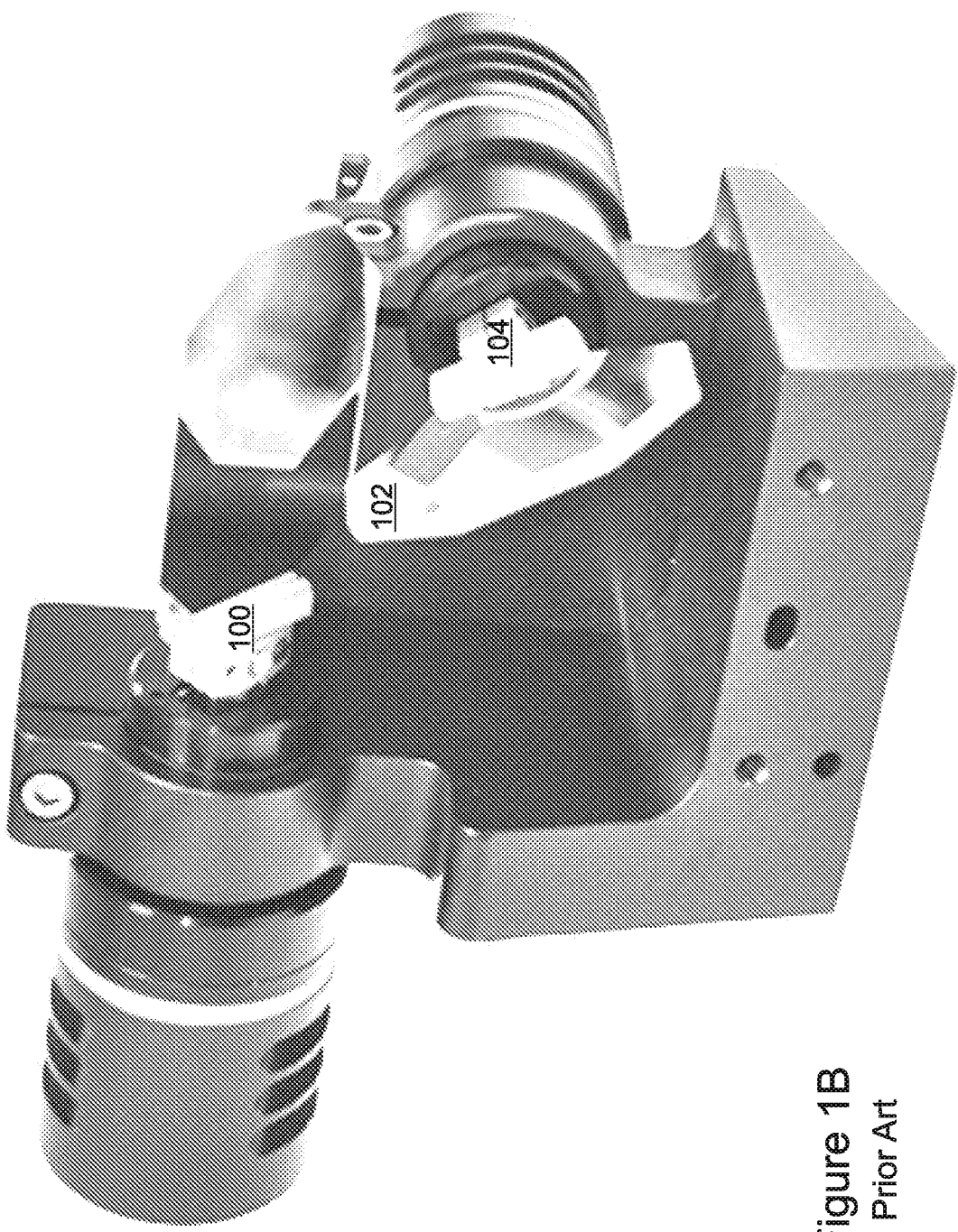
FIG. 1B is a perspective view of a pair of galvanometer mirrors having a common mount according to the prior art.
Figure 2A:
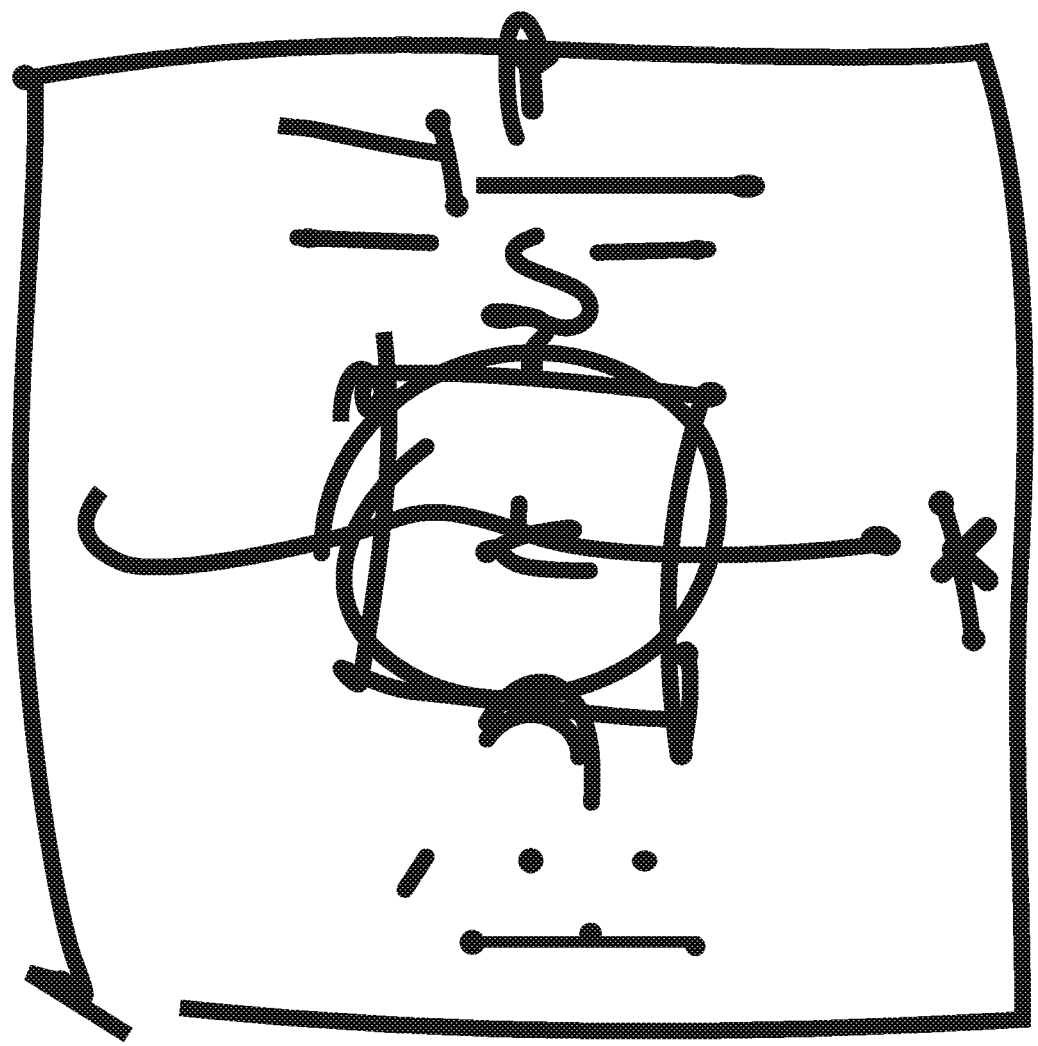
FIG. 2A is an illustration of a standard calibration test pattern used for galvanometer adjustment according to the prior art, shown in an uncalibrated state.
Figure 2B:
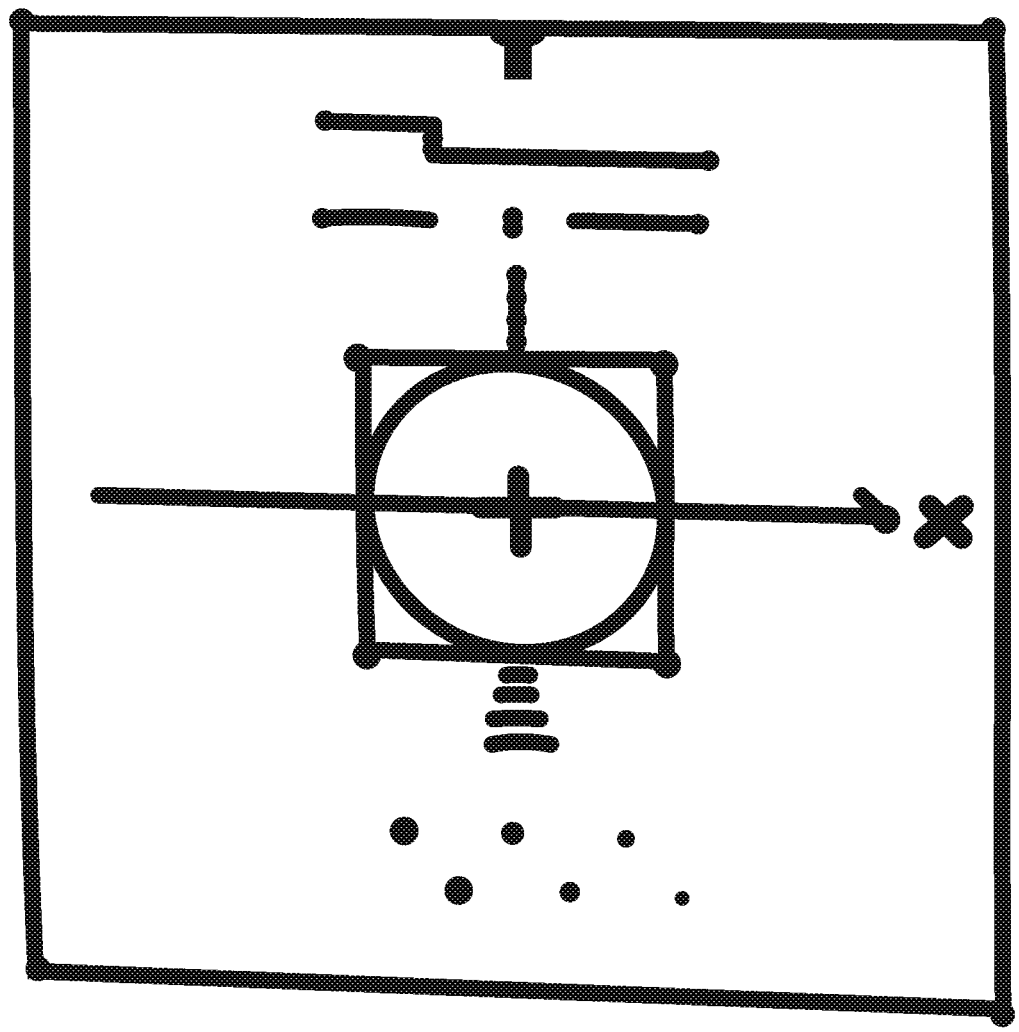
FIG. 2B is an illustration of the standard calibration test pattern of FIG. 2A, shown in a calibrated state.
Figure 3:
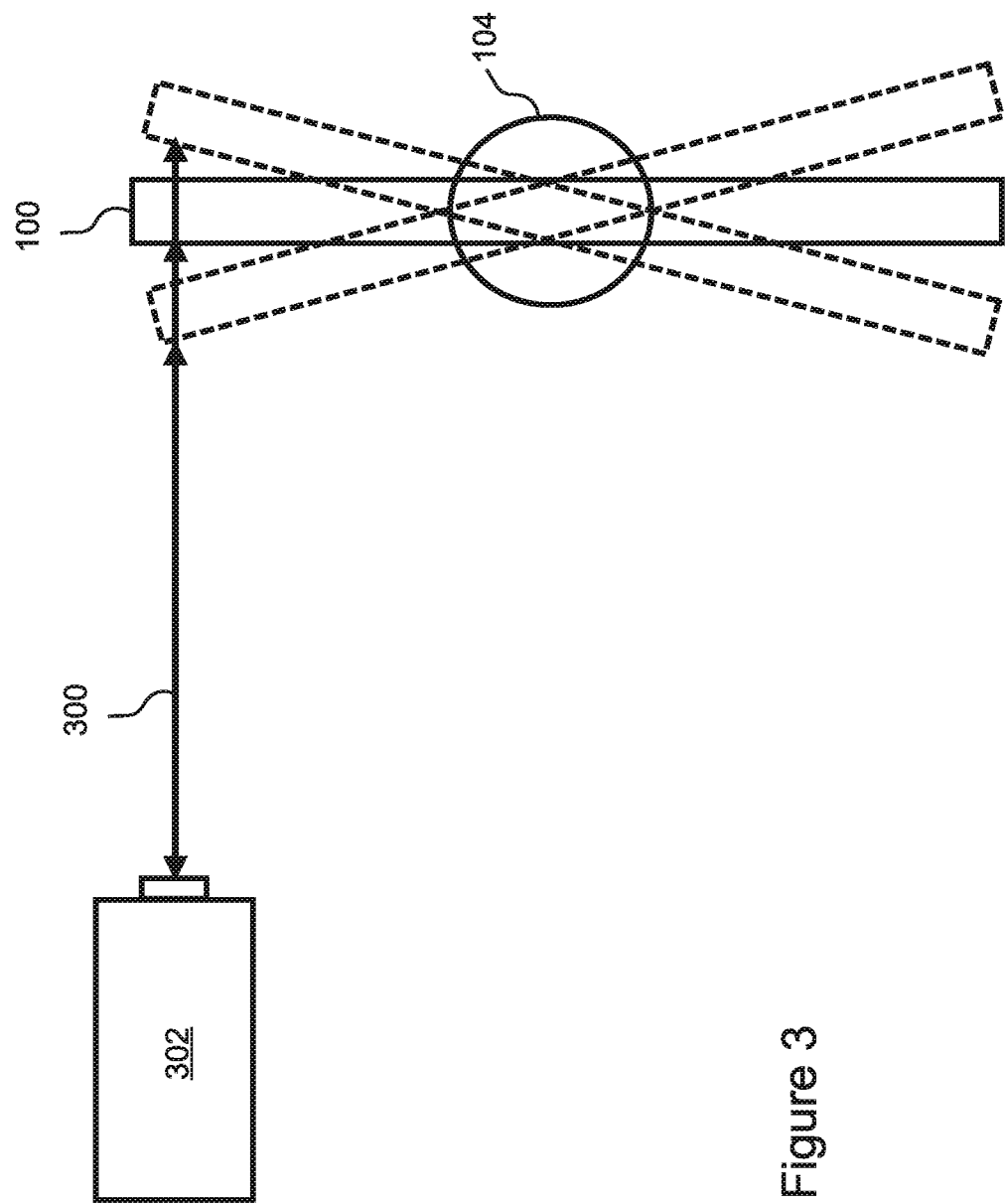
FIG. 3 is a side view of an embodiment of the present invention wherein a single laser sensor directs a calibration laser beam directly onto one side of a galvanometer mirror.

Specifically, with reference to FIG. 3, the present method implements a laser-based measurement system, whereby at least one calibration laser beam 300 from a calibration "sensor" 302 impinges directly onto a side region of at least one galvanometer mirror 100 so as to determine the rotational positioning, velocity, and/or acceleration of the mirror 100 during galvanometer operation. In some embodiments, the mirror position is determined by laser interferometry, while in other embodiments the laser position is determined by time-of-flight laser positioning. In various embodiments, Doppler shifts in the laser frequency are used to characterize the angular velocity of the mirror.

By characterizing the angular position, velocity, and/or acceleration of the mirror 100 directly, rather than characterizing the position of the motor 104 and then indirectly inferring the position of the mirror 100, the present invention circumvents the accumulated errors that arise during operation of the galvanometer, including errors due to the finite mass of the galvanometer mirror 100 and torsional flexibility of the mirror shaft 108.

In embodiments, the measurement data obtained from the calibration laser beam is 300 corrected to account for shifts in the location where the calibration beam 300 impinges on the mirror 100 that arise due to mirror rotations. It can be seen, for example, from the dotted lines in FIG. 3 that the beam 300 impacts the mirror 100 at a location closer to the edge of the mirror 100 when it is rotated (dotted lines) as compared to when it is not rotated (solid lines).

Figure 4:
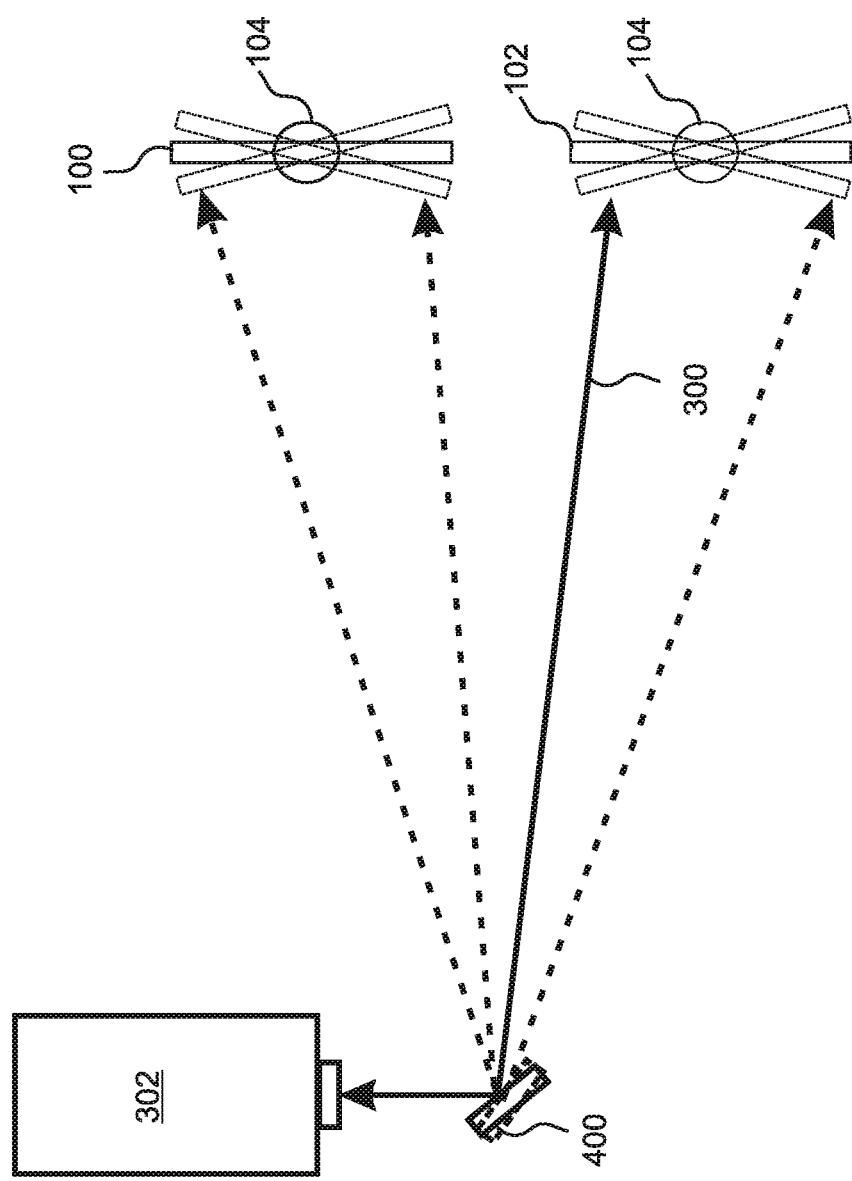
FIG. 4 is a side view of an embodiment of the present invention that includes a calibration mirror that directs the calibration laser beam between a plurality of locations on a plurality of mirrors.

With reference to FIG. 4, in some embodiments the measurement system includes at least one calibration mirror 400 that is able to direct the calibration beam 300 from the sensor 302 to the galvanometer mirror 102. In some of these embodiments, as shown in FIG. 4, one or more calibration mirrors 400 are used to transition the calibration beam 300 to different locations on a galvanometer mirror 100, 102 and/or between mirrors 100, 102 in the galvanometer system.

Figure 5:
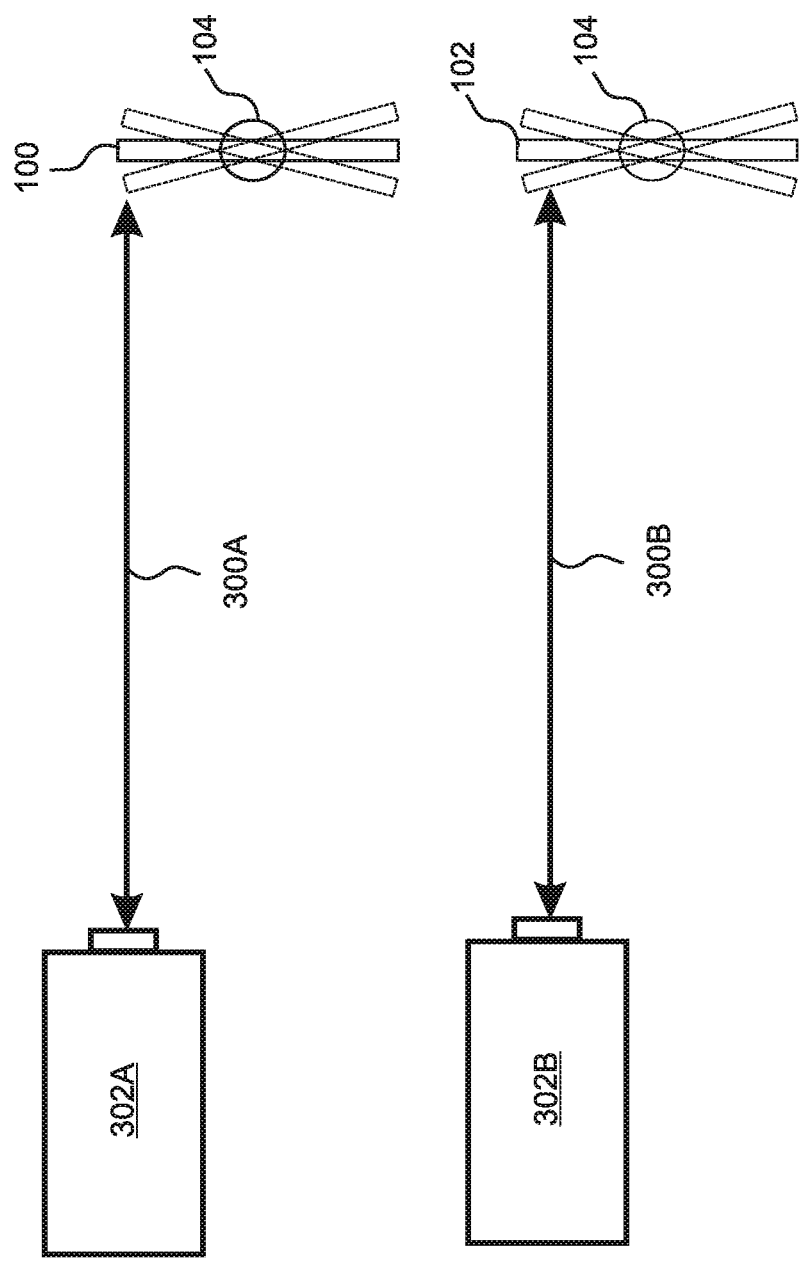
FIG. 5 is a side view of an embodiment in which a plurality of laser sensors direct calibration laser beams onto a plurality of mirrors in the galvanometer.
Figure 6:
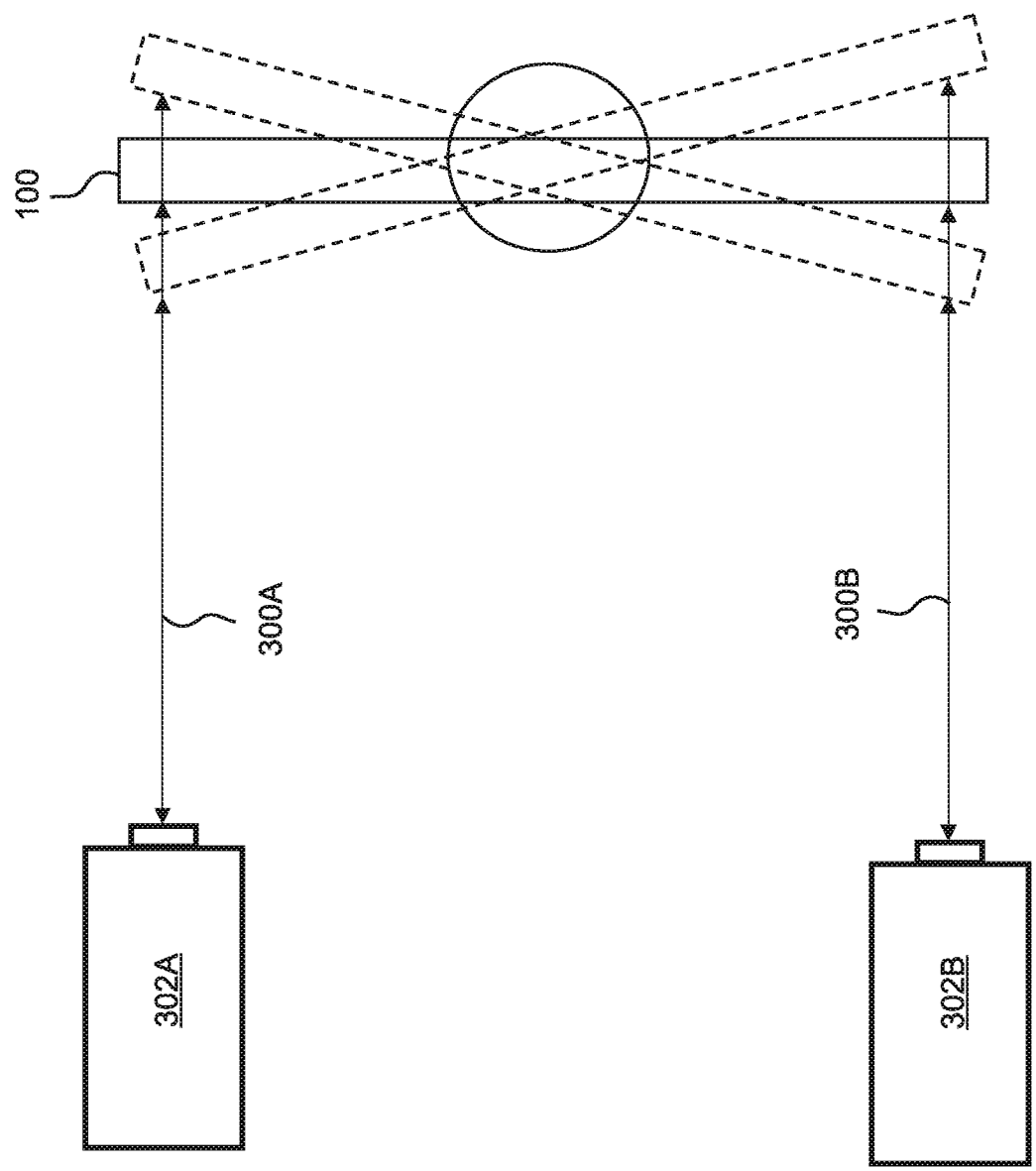
FIG. 6 is a side view of an embodiment in which two laser sensors direct calibration laser beams onto two opposing sides of a mirror in the galvanometer.

With reference to FIG. 5, in other embodiments the measurement system includes a plurality of laser sensors 302A, 302B that can direct a plurality of calibration laser beams 300A, 300B onto mirrors 100, 102 in the galvanometer. Similarly, with reference to FIG. 6, in various embodiments calibration beams 300A, 300B, are directed onto more than one location on at least one mirror 100 in the galvanometer. For example, as shown in FIG. 6, a pair of sensors 302A, 302B can simultaneously measure positions of two opposing sides of a mirror 100, for improved accuracy in measuring the rotational positioning of the mirror. The calibration beams can be generated by a plurality of laser sensors, as shown in the figure, and/or by using a beam splitter to split the laser beam.

Figure 7:
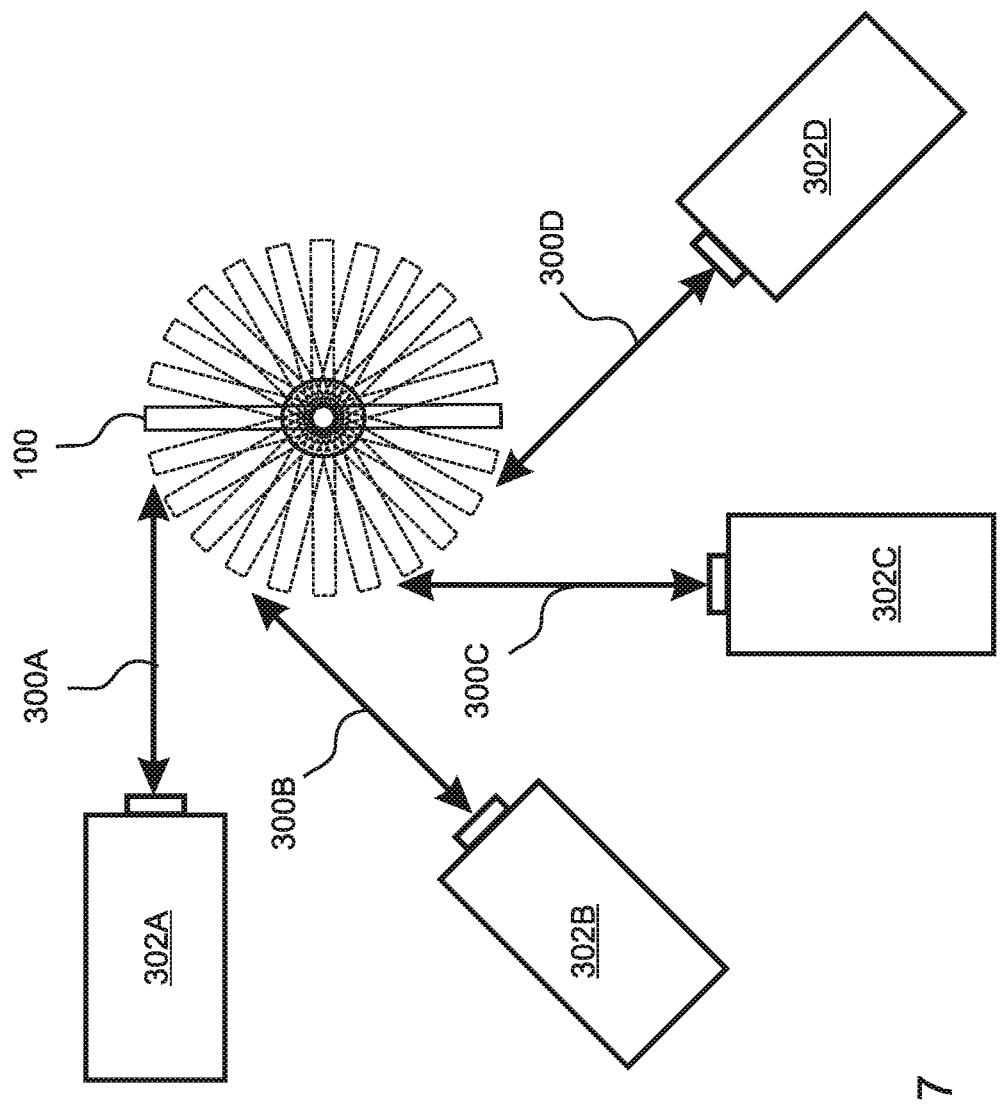
FIG. 7 is a side view of an embodiment in which a plurality of laser sensors direct calibration laser beams onto the mirror from a plurality of directions, thereby accommodating a wide rotational measurement range.

Embodiments are able to accommodate a large mirror rotation range by dividing the rotation range into a plurality of measurement sub-ranges. In some of these embodiments, the measurement sub-ranges are accommodated by using one or more calibration mirrors to re-route the calibration beam so that it can approach the galvanometer mirror from different directions. With reference to FIG. 7, in other embodiments, separate calibration laser beams 300A-300D are directed at the galvanometer mirror 100 from different directions by positioning a plurality of calibration sensors 302A-302D at corresponding locations surrounding the galvanometer mirror 100.

In some embodiments, the disclosed apparatus is applied to a separate galvanometer, while in other embodiments the apparatus is integral with the galvanometer. In some of these embodiments, the apparatus is able to monitor the performance of the galvanometer over time, and to alert a user and/or automatically recalibrate the galvanometer if and when needed.

Figure 8:
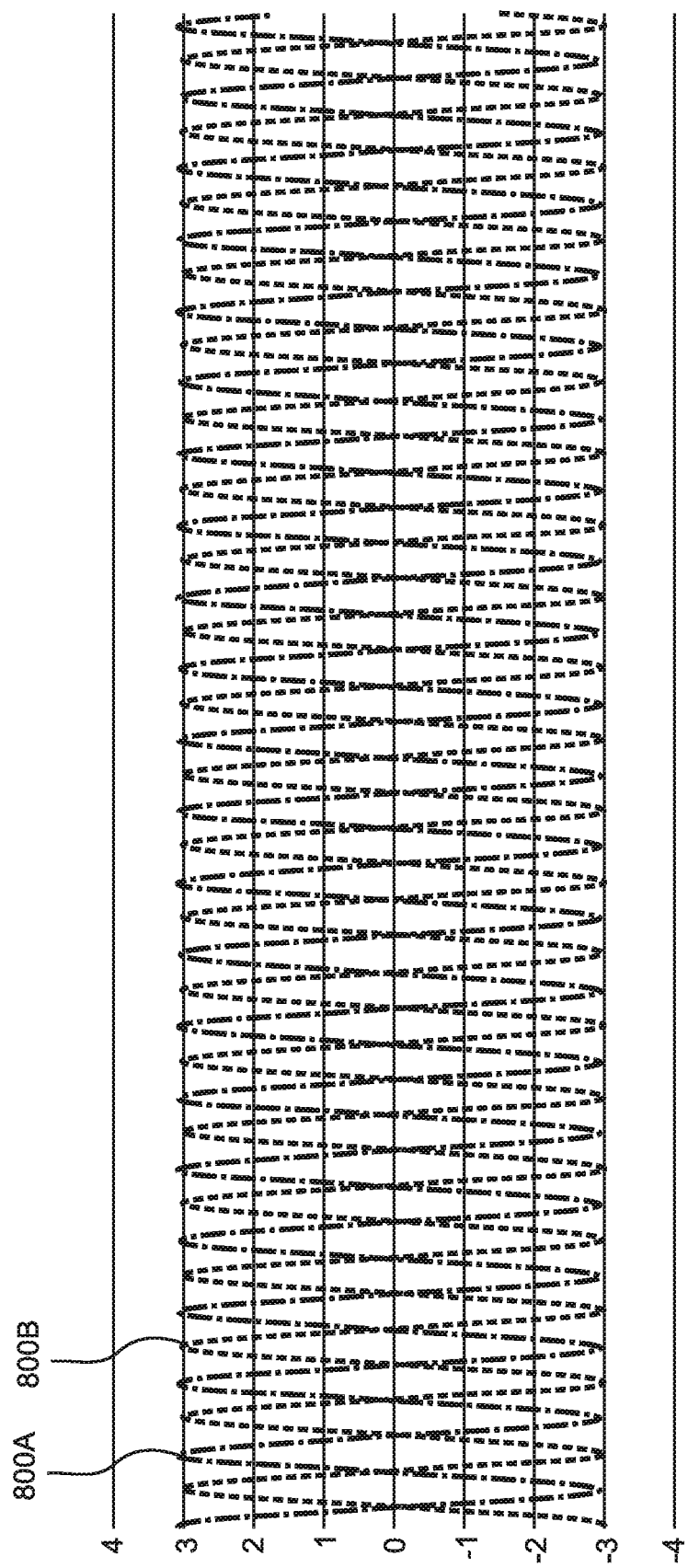
FIG. 8 is a plot of data obtained using the method of FIG. 6.

In a first general aspect, the invention is a method and apparatus for quantitatively characterizing the performance of a laser steering galvanometer system. For example, FIG. 8 presents position measurements obtained from the embodiment of FIG. 6, whereby two curves 800A, 800B are obtained using the two laser sensors 302A, 302B respectively. The data in FIG. 8 was obtained with a laser oscillation rate of 60 kHz. Note the symmetrical offset of the two measurement curves. According to this first general aspect, measured data such as the data of FIG. 8 is recorded and compared to "ideal" positioning, so as to quantitatively characterize the calibration and any remaining errors in the galvanometer system.

Figure 9:
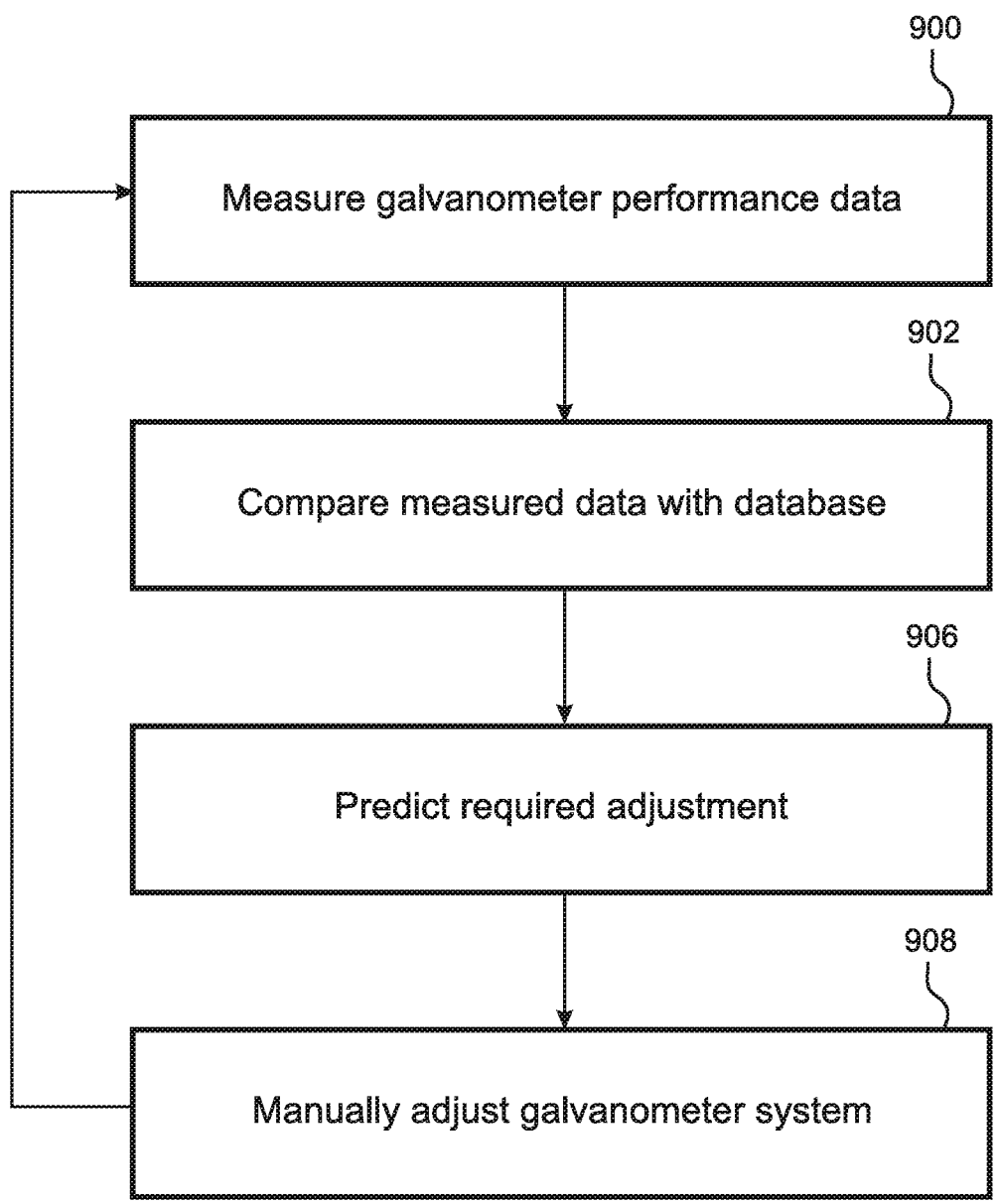
FIG. 9 is a flow diagram of an embodiment of the disclosed method of the present invention.

In a second general aspect, the invention is a method of facilitating calibration of a laser steering galvanometer by predicting the adjustments that are required so as to properly calibrate the system based on measured galvanometer performance such as FIG. 8. With reference to FIG. 9, in embodiments measured performance deviations from the "ideal" values are measured 900 and compared with a database 902 of known performance deviations and corresponding adjustment errors so as to predict 904 the actual adjustment errors that require correction. The corrections are then made by hand 906, and the process is repeated until the desired result is obtained.

In a third general aspect, the invention is a method and apparatus for automatically calibrating a digital laser steering galvanometer system. In embodiments, the method is the same as FIG. 9, except that the predicted galvanometer adjustments are made automatically instead of by hand.

In a fourth general aspect, the invention is an apparatus for controlling the operation of a galvanometer, whereby direct measurements of mirror position are used as the feedback data for controlling servo motors that rotate the galvanometer mirrors.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application.

The invention illustratively disclosed herein suitably may be practiced in the absence of any element which is not specifically disclosed herein and is not inherently necessary.

However, this specification is not intended to be exhaustive. Although the present application is shown in a limited number of forms, the scope of the invention is not limited to just these forms, but is amenable to various changes and modifications without departing from the spirit thereof. One of ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

What is claimed is:

1. A method of directly measuring an angular orientation and/or rotational movement of a mirror included in a galvanometer system and rotatably controlled by a motor, the method comprising:
   1) directing the motor to rotate the mirror to a desired orientation;
   2) causing a laser measurement system to direct a transmitted laser beam onto a side region of the mirror, said transmitted laser beam being reflected thereby such that it substantially reverses its direction and returns as a reflected laser beam to the laser measurement system;
   3) detecting the reflected laser beam;
   4) determining mirror rotation information from the reflected laser beam;
   5) repeating steps 1-4; and
   6) quantitatively characterizing mirror positioning error information based on a difference between the determined mirror rotation information and ideal mirror rotation information.

2. The method of claim 1, further comprising calibrating the galvanometer system by:
   7) Predicting required calibration adjustments of the galvanometer system based on the mirror positioning error information; and
   8) implementing the predicted calibration adjustments.

3. The method of claim 2, further comprising repeating steps 1 through 8.

4. The method of claim 2, wherein predicting the required calibration adjustments includes comparing the mirror positioning error information with known error information and corresponding known calibration misadjustments.

5. The method of claim 2, wherein the predicted calibration adjustments are implemented manually.

6. The method of claim 2, wherein the predicted calibration adjustments are implemented electronically.

7. A method of controlling an angular orientation and/or rotational movement of a mirror included in a galvanometer system and rotatably controlled by a motor, the method comprising:
   a) directing a command to the motor to rotate the mirror to a desired orientation;
   b) causing a laser measurement system to direct a transmitted laser beam onto a side region of the mirror, said transmitted laser beam being reflected thereby such that it substantially reverses its direction and returns as a reflected laser beam to the laser measurement system;
   c) detecting the reflected laser beam;

d) determining an orientation of the mirror from the reflected laser beam; and
e) updating the command according to a difference between the determined orientation of the mirror and the desired orientation.

8. The method of claim 1, wherein the laser measurement system is able to determine at least one of an angular position, an angular velocity, and an angular acceleration of the mirror.

9. The method of claim 1, wherein the laser measurement system is able to measure a rotational velocity of the mirror according to Doppler shifts of the reflected laser beam as compared to the transmitted laser beam.

10. The method of claim 1, wherein determining the mirror rotation information from the reflected laser beam includes correcting the rotation information so as to account for changes in an impingement location of the transmitted laser beam on the mirror due to rotation of the mirror.

11. The method of claim 1, wherein the method includes applying a plurality of transmitted laser beams simultaneously to the mirror.

12. The method of claim 11, wherein the transmitted laser beams are applied simultaneously to opposite sides of the mirror.

13. The method of claim 1, wherein determining the mirror rotation information includes dividing a measurement range into a plurality of subranges, and for each of the subranges directing the transmitted laser beam onto the mirror from a corresponding measurement direction.

14. A mirror rotation information measurement apparatus configured to measure mirror rotation information pertaining to a mirror included in a galvanometer system, the apparatus comprising a laser sensor configured to:
direct a transmitted laser beam onto a side region of the mirror, said transmitted laser beam being reflected thereby such that it substantially reverses its direction and returns as a reflected laser beam to the laser sensor;
detect the reflected laser beam; and
obtain mirror rotation information from the reflected laser beam.

15. The apparatus of claim 14, wherein the apparatus is integral with the galvanometer system.

16. The apparatus of claim 14, wherein the laser measurement system includes a laser interferometer.

17. The apparatus of claim 14, wherein the laser measurement system includes a time-of-flight distance sensor.

18. The method of claim 7, wherein the method includes applying a plurality of transmitted laser beams simultaneously to the mirror.

19. The method of claim 7, wherein the laser measurement system is able to measure a rotational velocity of the mirror according to Doppler shifts of the reflected laser beam as compared to the transmitted laser beam.

20. The method of claim 7, wherein determining the orientation of the mirror from the reflected laser beam includes accounting for changes in an impingement location of the transmitted laser beam on the mirror due to rotation of the mirror.

* * * * *